United States Patent
Hövelmann et al.

(10) Patent No.: US 6,817,628 B2
(45) Date of Patent: Nov. 16, 2004

(54) ROLLOVER PROTECTION SYSEM FOR MOTOR VEHICLES WITH PREDETERMINED DEFORMATION POINT

(75) Inventors: Klaus Hövelmann, Ribbesbüttel (DE); Michael Nass, Bergneustadt (DE); Manuela Zupancic, Bergneustadt (DE); Reinhard Nowack, Drolshagen (DE); Hans-Gerd Menne, Bergneustadt (DE)

(73) Assignee: ISE Innomotive Systems, Bergneustadt (DE)

( * ) Notice: Subject to any disclaimer, the term of this patent is extended or adjusted under 35 U.S.C. 154(b) by 17 days.

(21) Appl. No.: 10/224,130

(22) Filed: Aug. 20, 2002

(65) Prior Publication Data

US 2003/0042722 A1 Mar. 6, 2003

(30) Foreign Application Priority Data

Aug. 31, 2001 (DE) .......................... 101 42 466
May 25, 2002 (DE) .......................... 102 23 420

(51) Int. Cl.[7] ............................................. B60R 21/13
(52) U.S. Cl. ...................... 280/756; 280/753; 188/377
(58) Field of Search ................... 280/753, 756; 188/371, 377; 296/102; 267/139, 140

(56) References Cited

U.S. PATENT DOCUMENTS

| | | | | |
|---|---|---|---|---|
| 3,843,182 A | * | 10/1974 | Walls et al. | 293/122 |
| 3,938,840 A | * | 2/1976 | Haase et al. | 293/110 |
| 4,272,114 A | * | 6/1981 | Hirano et al. | 293/133 |
| 4,350,367 A | * | 9/1982 | Kolb et al. | 280/756 |
| 4,515,393 A | * | 5/1985 | Sauter | 280/756 |
| 5,205,585 A | * | 4/1993 | Reuber et al. | 280/753 |
| 5,236,219 A | * | 8/1993 | Jambor et al. | 280/756 |
| 5,273,314 A | * | 12/1993 | Sakakibara | 280/752 |
| 5,419,416 A | * | 5/1995 | Miyashita et al. | 188/371 |
| 5,622,382 A | * | 4/1997 | Zepnik et al. | 280/756 |
| 5,626,361 A | * | 5/1997 | Heiner | 280/756 |
| 5,890,738 A | * | 4/1999 | Heiner et al. | 280/756 |
| 6,296,278 B1 | * | 10/2001 | Zupancic et al. | 280/756 |
| 6,315,326 B1 | * | 11/2001 | Muller et al. | 280/756 |
| 6,334,366 B1 | * | 1/2002 | Schuler et al. | 74/2 |
| 6,352,285 B1 | * | 3/2002 | Schulte et al. | 280/756 |
| 6,386,585 B1 | * | 5/2002 | Muller et al. | 280/756 |

FOREIGN PATENT DOCUMENTS

| | | |
|---|---|---|
| DE | 198 38 989 C1 | 11/1991 |
| DE | 43 42 400 C2 | 2/1995 |
| DE | 44 44 894 A1 | 6/1996 |
| DE | 195 23 790 A1 | 1/1997 |
| DE | 199 31 224 A1 | 1/2001 |
| EP | 0 952 042 A1 | 10/1999 |
| GB | 2 280 456 A * | 2/1995 |

* cited by examiner

*Primary Examiner*—Paul N. Dickson
*Assistant Examiner*—George D. Spisich
(74) *Attorney, Agent, or Firm*—Hudak, Shunk & Farine, Co. LPA

(57) ABSTRACT

This type of rollover protection system typically comprises a roll bar body that is either firmly anchored to the vehicle, or is displaceably guided in a guide element that is fixed to the vehicle, in conjunction with a locking device that serves as a retraction blocking mechanism to lock the deployed roll bar body against any unintended retraction.

To structurally control high peak loads that occur in a rollover without a total failure of the protective system, particularly of the locking device in deployable systems, the invention provides that the roll bar body, possibly the associated guide element and its fixation on the vehicle as well as the retraction blocking mechanism be configured as a rigid system relative to the maximum load that occurs in a rollover. A cross-member-type support element terminating the roll bar body on the end face is configured as a predetermined deformation point for a limited defined deformation path in load direction for energy degradation.

12 Claims, 3 Drawing Sheets

ROLLOVER PROTECTION SYSEM FOR MOTOR VEHICLES WITH PREDETERMINED DEFORMATION POINT

FIELD OF THE INVENTION

The invention relates to a rollover protection system, comprising a roll bar body which in a rollover accident is supported on a structural part of the motor vehicle and the end face of which is provided with at least one supporting element over which the motor vehicle rolls in a rollover accident, and a predetermined deformation point for reducing peak loads in a rollover accident.

BACKGROUND OF THE INVENTION

Such rollover protection systems serve to protect the occupants of motor vehicles without a protective roof, typically convertibles or sports cars.

It is known in the art to provide a permanently installed roll bar spanning the entire width of the vehicle.

This solution has the drawback that it increases air resistance and driving noise, quite apart from detracting from the appearance of the vehicle.

It is also known in the art to assign each vehicle occupant a permanently installed roll bar, the height of which is not adjustable. This solution is typically used for sports cars to emphasize the car's sporty appearance.

Widely known design solutions for convertibles comprise a roll bar which is normally retracted and which, in case of danger, i.e. in case of an impending rollover, is quickly deployed into a protective position to prevent the vehicle occupants from being crushed by the rolling vehicle.

These solutions typically comprise a roll bar body that is U-shaped or is formed by a structural section and is guided in a guide element that is permanently fixed to the vehicle. The guide element is fixed inside a cassette housing. This roll bar body is normally kept in a lower initial position by a holding device against the bias of a compression spring drive mechanism. In the event of a rollover it is deployed to its upper protective position through the spring force of the compression spring drive mechanism, controlled by a sensor, which releases the holding device. An actively engaging locking device, i.e. a retraction blocking mechanism, then prevents the roll bar from being pushed in.

Each vehicle occupant is assigned one cassette.

The holding device typically comprises a holding element that is fixed to the roll bar body and is mechanically linked with a release mechanism on a sensor-controlled tripping system. This tripping system normally comprises a release magnet, a so-called crash magnet, or a pyrotechnically activated release device.

The locking device that serves as a retraction blocking mechanism typically comprises a pivotably coupled, spring-biased locking pawl with tooth segments and a fixed toothed bar, a locking pin or the like. One locking element is connected with the roll bar while the other is fixed to the vehicle.

Such a cassette construction of a rollover protection system with a U-shaped roll bar is disclosed, for instance, in German Laid Open Publication DE 43 42 400 A1. An alternative cassette construction with a roll bar body in the form of a structural section is disclosed particularly in German Patent Specifications DE 195 23 790 C1 and DE 198 38 989 C1.

The aforementioned known rollover protection system as described in German Laid Open Publication DE 43 42 400 A1 comprises a housing in the form of a U-shaped cassette that is open on one side and has two sidewalls, which on the open side of the cassette each have an outwardly bent angular section for mounting the cassette to the vehicle. A bottom plate is furthermore mounted to the sidewalls, which are interconnected at their end face by a cover wall. The rollover protection system further has a U-shaped roll bar comprising a curved section and two parallel tubular legs, each of which has a closed lateral surface and the open ends of which are interconnected by means of a stiffening cross-member-type connection element.

The system further comprises two standpipes, one end of which is fixed to the housing floor and the interior of which receives a compression spring that acts as the sole drive of the roll bar. These standpipes are each axially enclosed by a tubular leg and also have a closed lateral surface. They are further provided with a guide block, which is mounted to the upper end of the housing, flat against the sidewalls of the cassette, and which has guide openings for additional outer guidance of the tubular legs.

The alternative rollover protection system of the prior art according to the above-cited German Patent Specification DE 198 38 989 C1 has a roll bar body configured as a box-type section that is reinforced against bending and extends over the entire width of the bar. It is guided in a box-type basic section, i.e. the guide section, which is fixed to the vehicle and forms the cassette. The end face of the bar body is provided with a positive-locking cross-member-type supporting element. In a rollover accident, the vehicle rolls over this support element, i.e. this element is in direct contact with the ground. In the case of the similarly supported above-cited German Patent Specification DE 195 23 790 C1, the roll bar is made of a spectacle-shaped bar section, which is guided in a guide section that is fixed to the vehicle and extends only over a partial area of the bar section. In both designs, a toothed bar screwed to each bar section and a toothed pawl pivotably coupled to the guide section are provided as locking devices.

In a rollover accident, the rollover protection system must absorb the abruptly occurring impact load, particularly in the moving direction of the roll bar body, through the roll bar body and, in the case of deployable systems, also through the guide element and its fixation in the vehicle as well as the locking device and its fixation (retraction blocking mechanism). According to the latest findings, particularly in rigid systems, the forces that occur, can reach short-term peak loads of more than 10 tons depending on the speed and weight of the vehicle as well as the impact angle and the nature of the impact surface. The basic load that typically occurs and for which the systems are designed is approximately 5.0–7.0 tons.

To be able to absorb these high forces, the strategy has thus far been to design the entire deployable rollover protection system as a reinforced, rigid, i.e. non-deformable system. The roll bar body, the guide element and its fixation on the vehicle were designed as a non-deformable rigid system up to the highest possible loads. Furthermore, the retraction blocking mechanism, i.e. the locking components and their fixation means, i.e. the dimensioning of the toothed racks and their mounting screws or, concretely, their positive locking seat within the roll bar body as well as the locking pawl and the bolts by means of which it is coupled to the guide element, including the bolt bearing in the guide element, were designed for very high loads.

This strategy, however, proved to be economically inefficient because of the excessively high cost of materials, would require a correspondingly larger overall volume for the reinforced elements, which is not usually available, so that there are limits to the load absorption, and harbors the inherent risk that the elements of the retraction blocking mechanism may be abruptly destroyed, so that the retraction blocking mechanism would consequently lose its protective function completely.

If on the other hand the roll bar body/guide element system is made less rigid, it can be deformed when higher forces occur. Since this deformation is uncontrolled, the roll bar body may be deformed in such a way that it will partially lose its protective function.

German Laid Open Publication DE 199 31 224 A1 further discloses a rollover protection system in which the U-shaped roll bar is made of a brittle material, typically a fiber-reinforced plastic. Each leg is connected with the vehicle chassis by a deformation element. This system deliberately intends to increase the rigidity of the rollover body by means of the brittle material. The deformation element is intended to prevent the rollover body from abruptly fracturing if certain load limits are exceeded. This known measure, however, is limited to roll bars that are made of a special non-metallic material. Furthermore, it cannot be used for deployable systems, only for rigid systems.

German Publication DE 44 44 894 furthermore describes a roll bar whose curved support zones are equipped with energy absorbing enclosure parts. This serves to protect the vehicle occupants against impact to the head. Accordingly, these deformation elements are designed only for the type of loads that are normally assumed for enclosure parts in the interior of the vehicle. High peak loads as described above cannot be absorbed.

The object of the invention is to design a rollover protection system based on the principle of a predetermined deformation point in such a way that it can be used in both rigid and especially also in deployable systems as well as in systems that are equipped with typical metal roll bar bodies.

SUMMARY OF THE INVENTION

According to the invention, this object is attained by a rollover protection system for motor vehicles comprising a roll bar body which in a rollover accident is supported on a structural part of the motor vehicle and which at its end face is provided with at least one support element over which the vehicle rolls in a rollover accident, and a predetermined deformation point for reducing peak loads in a rollover accident, characterized in that the support element is configured as a predetermined deformation point for a limited, defined deformation path in load direction according to a given force/path diagram for energy degradation.

In deployable protection systems, this object according to the invention is attained by a rollover protection system for motor vehicles comprising a roll bar body that is guided in a guide element fixed to the vehicle and is normally held by a holding device in a lower, retracted initial position against the force of at least one compression spring-loaded drive mechanism, and when the holding device is released, the roll bar body is deployed by the spring force of the compression spring drive mechanism and is locked in an upper protective position by a retraction blocking mechanism, and its end face is provided with a cross-member-like support element over which the vehicle rolls in case of a rollover accident, characterized in that the roll bar body, the associated guide element and its fixation on the vehicle, as well as the retraction blocking mechanism are configured as a rigid system relative to the maximum load occurring in a rollover accident, and the cross-member-like support element is configured as a predetermined deformation point for a limited, defined deformation path in moving direction of the roll bar body according to a given force/path diagram for energy degradation.

This intrinsically rigid roll bar system prevents uncontrolled deformation of the system and thus a total loss of function. Providing the inventive predetermined deformation point in the cross-member-like support element makes it possible effectively to reduce the peak forces occurring in the support element in a rollover accident through the deformation energy at the very beginning of the impact, that is to say at the instant when the cross-member-like support element contacts the ground. The maximum load can thus be reduced by simple means and without increasing the overall volume required for the roll bar system components that are provided for the vehicle structure in the flow of forces, i.e. the roll bar body and, in deployable systems, its guide element and the retraction blocking mechanism. This makes it possible, in particular, to prevent shearing of the tooth flanks of the locking device that forms the retraction blocking mechanism, or even shearing of the components of its fastening elements.

Since deformation can occur only via a limited path in moving direction, the protective function of the retraction blocking mechanism is preserved in every case.

A further advantage of the solution according to the invention is its ready applicability to existing rollover protection systems, since the "deformation cross member" can be integrated in existing systems largely without affecting the overall volume and weight.

The invention can furthermore be applied to a wide variety of roll bar designs, particularly U-shaped metal roll bars or roll bars made of extruded sections, without any limitation regarding the aesthetic design.

Embodiments of the invention are identified in the dependent claims and will become clear also from the description of the figures.

BRIEF DESCRIPTION OF THE DRAWINGS

The invention will now be described in greater detail with reference to the exemplary embodiments depicted in the drawings in which.

DETAILED DESCRIPTION OF THE INVENTION

Figures 1, 2:
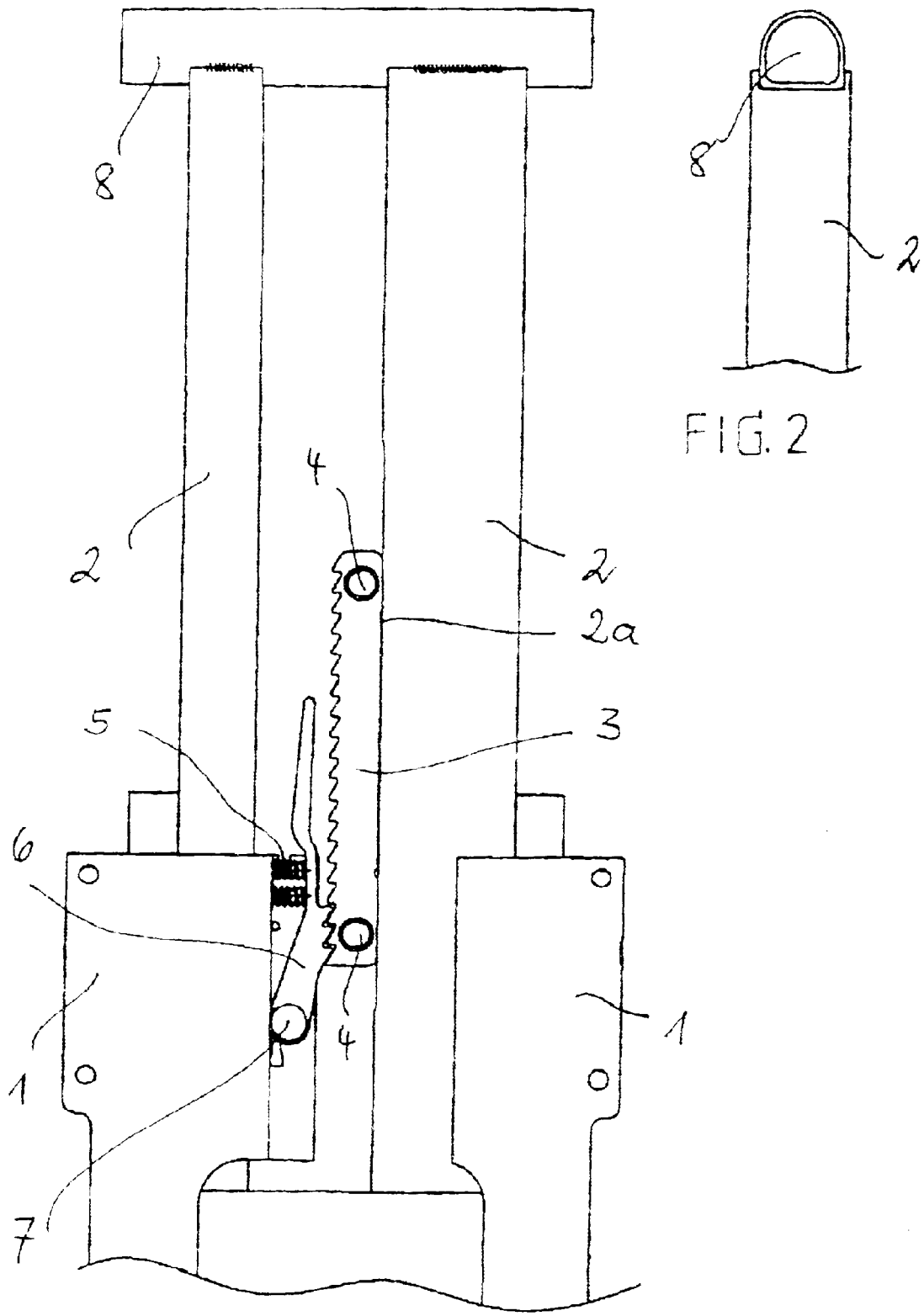
FIG. 1 is a schematic longitudinal section through a rollover protection system comprising a roll bar body in the form of a box-type section, which is guided in a structural section that is fixed to the vehicle, and comprising a locking device in the form of a toothed rack and a toothed pawl, where the structural section has a cross-member-type support element on the end face which is designed as a predetermined deformation point.
FIG. 2 is a side view of a detail of the box-type section including the support element on the end face in the form of a dome-shaped hollow section.
Figure 3:
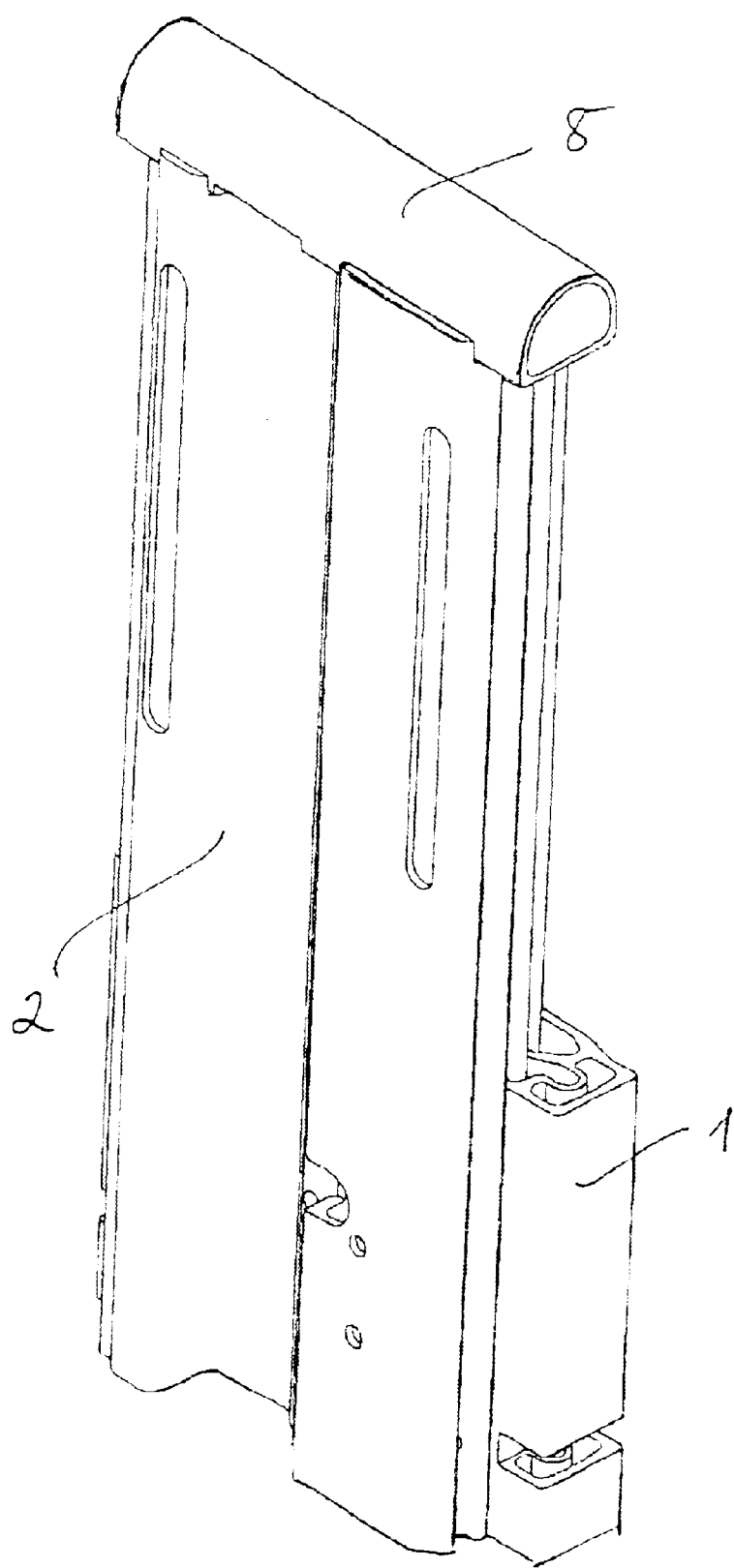
FIG. 3 is a perspective view of the rollover protection system shown in FIG. 1.

FIGS. 1 to 3 show a detail of an exemplary embodiment of a rollover protection system analogous to the system described in the initially cited German Patent Specification DE 198 38 989 C1, which is herewith expressly referenced with respect to the disclosure. This rollover protection system comprises a cassette-type guide section 1, which is fixed to the vehicle and guides a roll bar body 2 that consists of a box-type section. Additional guide elements are mounted in guide section 1. Roll bar body 2 is provided with a central opening for receiving a compression spring (not depicted) for the quick release of roll bar body 1 [sic]. Furthermore, on wall 2a of the box-type section forming roll bar body 2, a toothed rack 3 is mounted in known manner as one of the two locking components of the retraction blocking mechanism. This toothed rack is typically mounted by means of two screwed connections 4.

The second locking component is formed in known manner by a toothed pawl 6 that is spring-loaded by a spring 5 and that is pivotably mounted on a bolt 7, which is supported in guide section 1.

FIGS. 1 to 3 show the locked state of the extended roll bar body 2 in which the teeth of the two locking components are in active locking engagement.

The function of the locking device as a retraction blocking mechanism is well known in the art and does not need to be further described here.

The end face of the roll bar body 2 is provided with a positive locking cross-member-type support element 8 over which the vehicle rolls in case of a rollover, i.e., which will be in direct contact with the ground in a rollover accident. The support element can also be connected with the roll bar body in some other manner, e.g. by welding. In the case described in the cited prior art, German Patent Specification DE 198 38 989 C1, this cross-member-type support element is a solid box-type extruded section with a square cross-section. This support element, roll bar body 2, the associated guide section 1 and its attachment on the vehicle are configured as a rigid system relative to the maximum load occurring in a rollover accident, i.e. they are not subject to any deformation. If a defined force is exceeded, however, the support element is abruptly crushed, i.e. there is no continuous load reduction through deformation work.

To prevent toothed rack 3 that receives the full force acting on the roll bar body from being pulled off wall 2a because the fixation of the toothed rack, for the initially mentioned reasons, cannot be reinforced to just any degree and the retraction locking mechanism would consequently lose its effect, the invention provides that the cross-member-type support element 8, which is typically a structural section, be configured as a predetermined deformation point for a limited deformation path in the moving direction of roll bar body 2 for specific energy degradation, that is to say to provide a "deformation cross member."

For this purpose, the shape, the dimensions and the material of the "deformation cross member" are designed in such a way that if a defined force level is exceeded, a specific plastic deformation of the "deformation cross member" takes place, so that peak loads can be reduced and the roll bar body as well as the retraction blocking mechanism can absorb the rollover forces.

Thus, the decisive element is a constant force reduction according to a predefined force/path diagram instead of an abrupt crushing of the "deformation cross member," since practically the full peak force would otherwise continue to be present thereafter.

Figure 4:
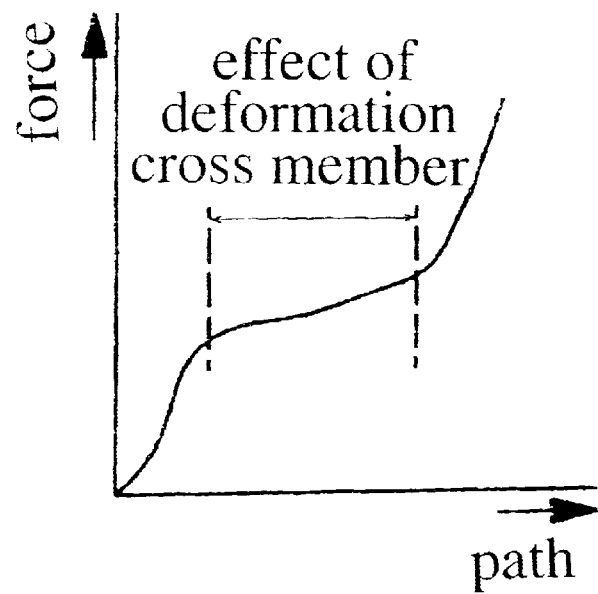
FIG. 4 is a force/path diagram showing the effect of the cross-member-type support element which is designed as the predetermined deformation point.

Such a predetermined deformation path as a result of the effect of the "deformation cross member" is shown in the force/path diagram of FIG. 4. After a rollover, the full rollover force is initially present without any deformation work. Thereafter the force causes deformation in the "deformation cross member" over a relatively large path before encountering a rigid system again.

Figure 5:
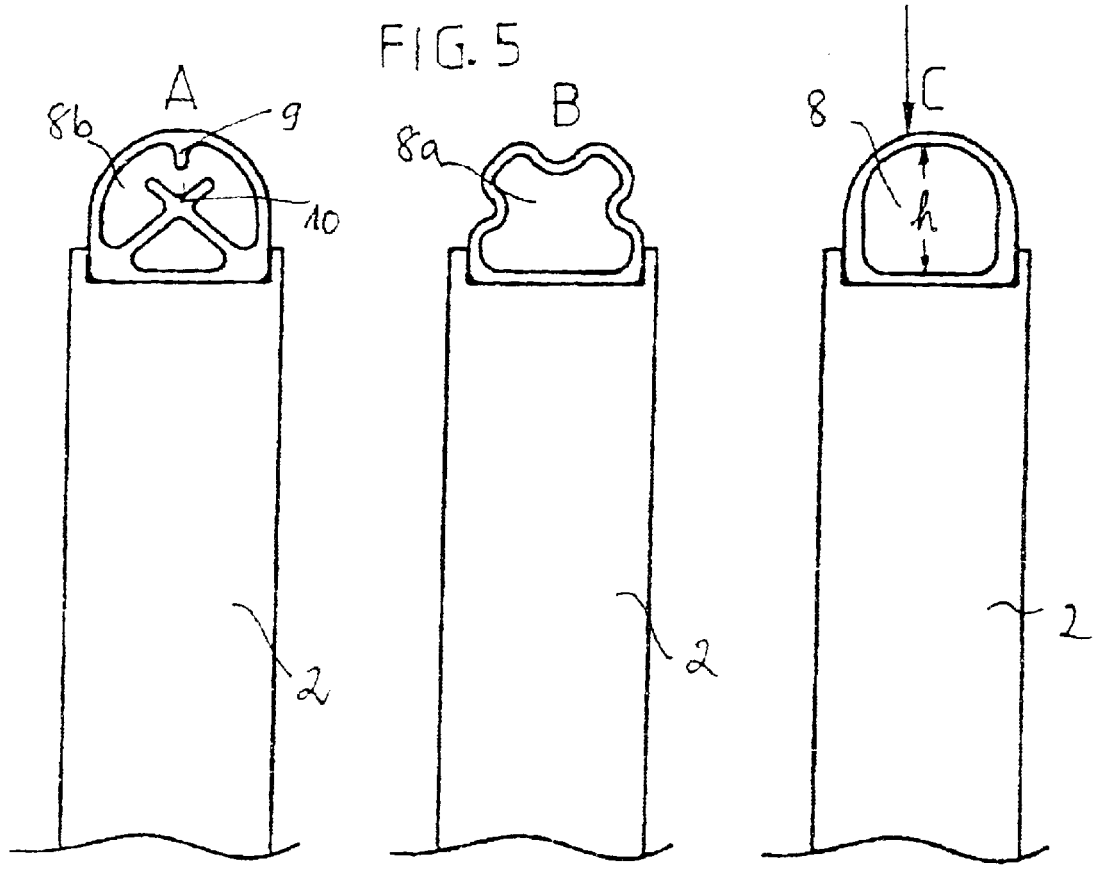
FIG. 5 shows three partial figures A, B and C of three different embodiments of the cross-member-type support element.

FIG. 5 depicts different configurations of the deformation cross member in three parts of the figure, A, B and C, which result in the force/path curve shown in FIG. 4. The configuration according to FIG. 5c corresponds to that depicted in FIGS. 1–3. These configurations are based on a hollow section.

FIG. 5C shows a dome-shaped configuration of the hollow section of deformation cross member 8, which is deformed continuously rather than abruptly by the external force acting in the direction of the arrow and thereby reduces the energy through the deformation work. The wall thickness of the hollow section preferably increases from top to bottom to make it possible to define progressively increasing deformation work. The wall thickness can change continuously, as shown, or it can change in increments.

In the case of the embodiment according to FIG. 5C, the path over which the force is reduced by deformation is limited by the height h of the dome, which typically measures 25–45 mm. Thus, the rollover radius can be reduced by this path, but the roll bar body itself must be made correspondingly longer.

FIG. 5A shows a first configuration of a deformation cross member 8b based on a dome-shaped structural section, in which the deformation path is more limited. This embodiment of the structural section is provided with an internal central appendix 9 and two appendices 10 extending crosswise in upward direction. If an external force is applied, appendix 9 comes to rest in the crossed appendices 10 after traveling a predetermined path. Depending on the force level, additional impact energy is progressively reduced due to the compression of the crossed appendices. Since the appendices 10 define the effect of the progression, the wall thickness of the hollow section of deformation cross member 8b shown in FIG. 5A can remain constant.

FIG. 5B shows a further embodiment of a deformation cross member 8a with a hollow section that has a meander-like outer contour. This winding outer contour also has the effect that the hollow section is deformed continuously rather than abruptly.

The dome-shaped hollow section can also be configured in such a way that it has a continuous central, inwardly directed "dent," the deformation of which causes more deformation work and which in addition limits the deformation path.

As an alternative to the embodiment according to FIG. 5A, the hollow section can also be configured in such a way that it has a plurality of interior appendices.

The hollow section of the deformation cross members 8, 8a and 8b is preferably made of light metal or steel materials. The wall thickness can vary between 1 mm and 5 mm. Height h preferably ranges from 25 to 45 mm. The base width is between 30 and 50 mm.

In general, the configuration of the hollow section can also be different from that shown in FIG. 5. For instance, a horizontal oval section is feasible, or a rectangular section with inwardly curved sidewalls.

Thus far, only one embodiment of the rollover protection system with a roll bar body and a deformation cross member mounted on its end face has been described.

The invention, however, can also be used for U-shaped roll bars, which typically comprise two guided tubular legs that are interconnected at their end face by a tubular crossbar. In such a configuration of the roll bar body either the crossbar itself can be configured as a deformation cross member or a deformation cross member as a separate part may be mounted to or integrated in the crossbar.

What is claimed is:

1. A rollover protection system for motor vehicles, comprising:
    a roll bar body which in a rollover accident is adapted to be supported on a structural part of the motor vehicle and which on its end face is provided with at least one support element over which the motor vehicle rolls in a rollover accident; wherein the support element includes a predetermined deformation point for a limited, defined deformation path in a load direction according to a given force/path diagram for energy degradation and is adapted to reduce peak loads in a rollover accident, and wherein the support element is configured as a hollow section which is dome-shaped.

2. A rollover protection system for motor vehicles as claimed in claim 1, comprising
    the roll bar body guided in a guide element, which is normally held in a retracted lower initial position by a holding device against the force of at least one compression spring-loaded drive mechanism, and when the holding device is released can be deployed to an upper protective position by the spring force of the compression spring drive mechanism and locked by means of a retraction blocking mechanism, and which on its end face is provided with the support element over which the motor vehicle rolls in a rollover accident,
    wherein the roll bar body, the associated guide element and its fixation on the vehicle, as well as the retraction blocking mechanism are configured as a rigid system relative to the maximum load occurring in a rollover.

3. A rollover protection system as claimed in claim 2, wherein the support element is mounted to the roll bar body.

4. A rollover protection system as claimed in claim 2, wherein the support element is integrated in the roll bar body.

5. A rollover protection system as claimed claim 2, wherein the hollow section is provided with specific cross-sectional reductions and/or material reductions.

6. A rollover protection system as claimed in claim 5, wherein the hollow section meanders at least in parts.

7. A rollover protection system as claimed in claim 2, wherein the wall thickness of the hollow section tapers from the base toward the top.

8. A rollover protection system as claimed in claim 7, wherein the wall thickness decreases continuously or in increments.

9. A rollover protection system as claimed in claim 2, wherein inwardly directed appendices are formed onto the hollow section to limit the deformation path.

10. A rollover protection system as claimed in claim 2, wherein the hollow section has a central depression.

11. A rollover protection system as claimed in claim 1, wherein the roll bar body has a rectangular cross section.

12. A rollover protection system as claimed claim 1, wherein the roll bar body is U-shaped.

* * * * *